(12) United States Patent
Zhang et al.

(10) Patent No.: US 11,100,050 B1
(45) Date of Patent: Aug. 24, 2021

(54) DENSE FILE RESERVATION IN THINLY PROVISIONED FILE SYSTEM

(71) Applicant: EMC Corporation, Hopkinton, MA (US)

(72) Inventors: Ye Zhang, Shanghai (CN); William C. Davenport, Burlington, MA (US); Jean-Pierre Bono, Westborough, MA (US); Yingchao Zhou, Beijing (CN); Chao Zheng, Shanghai (CN); Xianlong Liu, Shanghai (CN); Qi Mao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 580 days.

(21) Appl. No.: 14/501,522

(22) Filed: Sep. 30, 2014

(51) Int. Cl.
*G06F 3/06* (2006.01)
*G06F 16/17* (2019.01)
*G06F 16/13* (2019.01)

(52) U.S. Cl.
CPC .......... *G06F 16/1727* (2019.01); *G06F 3/067* (2013.01); *G06F 3/0626* (2013.01); *G06F 3/0643* (2013.01); *G06F 3/0644* (2013.01); *G06F 16/13* (2019.01); *G06F 3/0638* (2013.01)

(58) Field of Classification Search
None
See application file for complete search history.

(56) References Cited

U.S. PATENT DOCUMENTS

| | | | | |
|---|---|---|---|---|
| 8,285,758 B1 * | 10/2012 | Bono | ................ | G06F 17/30079 707/822 |
| 8,407,265 B1 * | 3/2013 | Scheer | ............. | G06F 17/30138 707/823 |
| 8,601,214 B1 * | 12/2013 | Chakalian | ......... | G06F 17/30132 711/114 |
| 2007/0260842 A1 * | 11/2007 | Faibish | ................... | G06F 3/061 711/170 |
| 2010/0057791 A1 * | 3/2010 | Schneider | ......... | G06F 17/30091 707/E17.01 |
| 2014/0297987 A1 * | 10/2014 | Garson | ................. | G06F 12/023 711/170 |

* cited by examiner

*Primary Examiner* — Michelle T Bechtold
(74) *Attorney, Agent, or Firm* — BainwoodHuang

(57) ABSTRACT

A data storage system operates a file system as a thinly provisioned file system having a host-visible virtual space and a smaller allocated space of underlying physical storage from a pool. The file system applies formatting to the allocated space and utilizes formatted allocated space for storing host files. The file system receives a file I/O request that requires increasing the allocated space of the file system, and in response (1) obtains an extent of physical storage from the pool and adds it to the file system as added allocated space, and (2) formats an initial portion of the added allocated space and satisfies the file I/O request using the formatted initial portion. Over a subsequent period the file system incrementally formats additional portions of the added allocated space and satisfies subsequent file I/O requests from the added portions.

13 Claims, 6 Drawing Sheets

DENSE FILE RESERVATION IN THINLY PROVISIONED FILE SYSTEM

BACKGROUND

File-based data storage systems are known in the art. These systems include programming and hardware structures to provide file based access to file systems. File-based data storage systems are sometimes referred to as Network Attached Storage or NAS systems. Such systems may support NFS (Network File System), CIFS (Common Internet File System), SMB (Server Message Block), and/or other file-based protocols. With file-based protocols, host computers (hosts) perform read and write operations to files by specifying particular file systems, paths, and file names. Internally to the data storage system, file system directories map the files specified by host commands to particular sets of blocks on internal volumes, which themselves are derived from underlying physical storage units from devices such as disk drives or electronic flash drives. The data storage system accesses the mapped locations and performs the requested reads or writes.

SUMMARY

Modern file-based data storage systems may support so-called thinly provisioned (or "thin") file systems, which have a large host-visible virtual size and a generally smaller allocated size that grows only as file system space is utilized. A thinly provisioned file system and thin (or "sparse") files can be used to provide storage for virtual disks of virtual machines, for example. A virtual disk at any given time is generally only partially full, so it is more efficient to allocate storage according to the actual virtual disk usage rather than its configured size. A thin file can provide this kind of storage structure.

In some cases a thinly provisioned file system supports both regular, or "dense" files, as well as sparse or thin files. For example, the Common Internet File System (CIFS) utilizes dense files. For dense files, underlying storage space must be available up to the file size, so that an I/O operation to any location of the dense file is not failed with a NO-SPACE error. When a dense file is extended (or I/O is written beyond the current end-of-file), additional space is first reserved. If the reservation can't be made, the file extending is rejected.

In prior systems, extending a thinly provisioned file system can be time-consuming, because of the need to format all newly extended space. In particular, once the space is added to an underlying volume of the file system, it is then necessary for the file system to format the entirety of the added space before any of the space is used for storing file data. The file system I/O operation that has triggered the extending might time out or receive a NO-SPACE condition, both of which are disruptive and undesirable. Moreover, these error conditions might occur not because of the lack of underlying storage space, but rather due to the need to fully format the space before allowing the file system I/O operation to be completed.

Methods and apparatus are disclosed that speed up the extending of a thinly provisioned file system while still providing the needed guarantee of full reservation of physical storage space for a dense file being created or extended. Newly extended space is added into the file system in batch but then formatted only incrementally over a subsequent period as file system space is used. A dense file reservation request waits only for adding the newly extended space into file system in batch and formatting an initial portion of the new space, but does not wait for the whole space to be formatted. Thus timeout and/or NO-SPACE errors are avoided when there is sufficient underlying physical storage to extend the size of the file system.

More particularly, a method is disclosed of operating a data storage system to provide file storage to hosts over a network. The method includes operating a file system as a thinly provisioned file system having a host-visible virtual space and a smaller allocated space of underlying physical storage drawn from a pool. The file system applies formatting to the allocated space and utilizes formatted allocated space for storing host files.

During operation the file system receives a file I/O request to a host file requiring an increase in the allocated space of the file system. In response, the file system (1) obtains an extent of physical storage from the pool and adds it to the file system as added allocated space, and (2) formats an initial portion of the added allocated space and satisfies the file I/O request using the formatted initial portion.

Over a subsequent period in which subsequent file I/O requests are received requiring underlying physical storage, the file system incrementally formats respective additional portions of the added allocated space and satisfies the file I/O requests from the respective formatted additional portions.

The host file may be a dense file which can only be extended by a given amount when the allocated space of the file system is also increased by that amount. Rather than requiring the complete formatting of the added space and risking a timeout or No-Space error, the technique permits more rapid completion of the triggering I/O request for the dense file while still ensuring that the added space is fully reserved.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
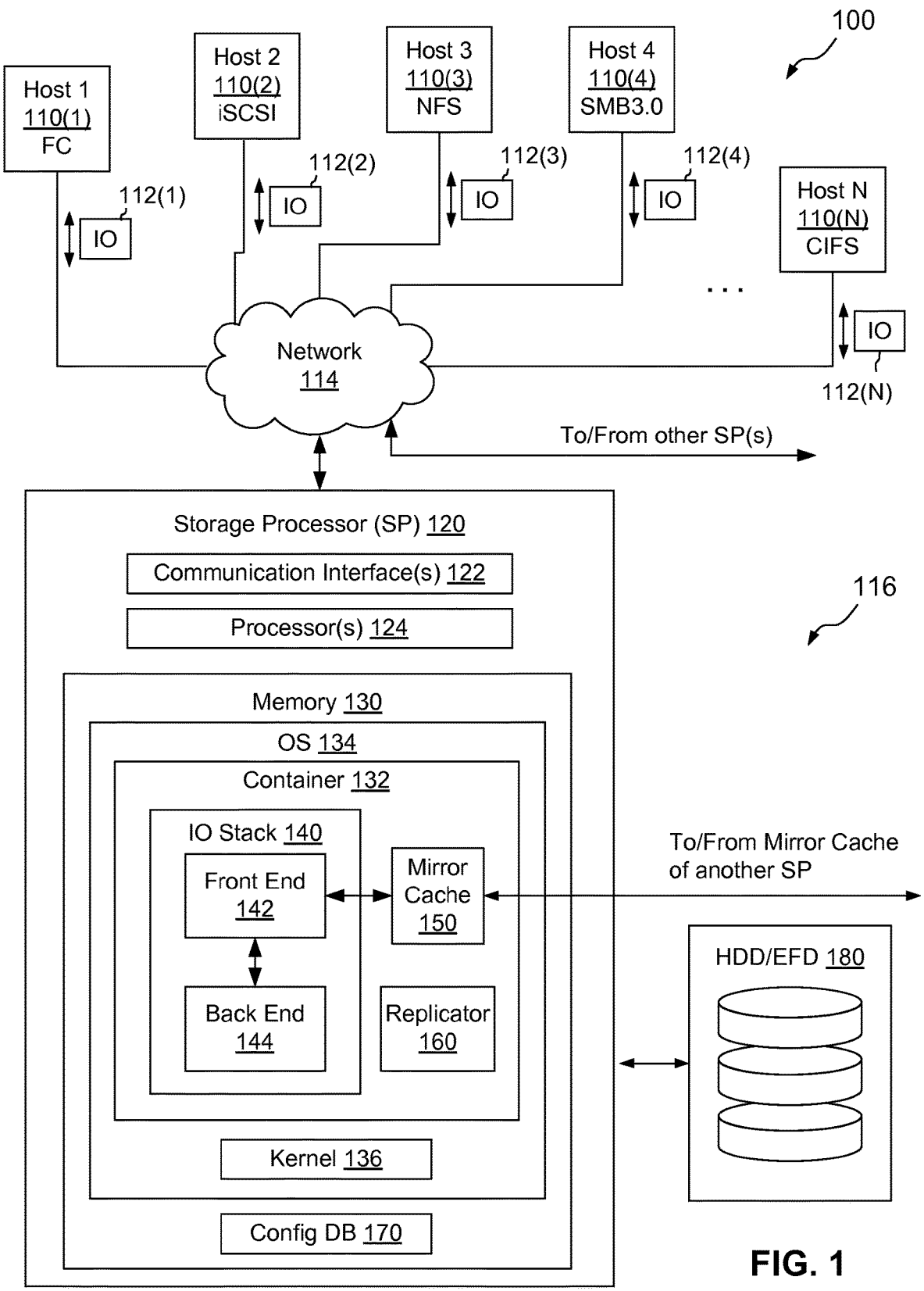
FIG. 1 is a block diagram showing a data storage apparatus in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the JO requests 112(1-N) at the communication interfaces 122 and passes the JO requests to the JO stack 140 for further processing. At the front end 142, processing may include caching data provided with any write JO requests to the mirror cache 150, which may in turn cache the data to another SP. Also within the front end 142, mapping operations map LUNs and host file systems to underlying files stored in a set of internal file systems of the front end 142. Host JO requests received for reading and writing both LUNs and file systems are thus converted to reads and writes of respective files. The JO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the JO stack 140 may be implemented in a "modular" arrangement, with the front end 142 on one SP and the back end 144 on another SP. The JO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
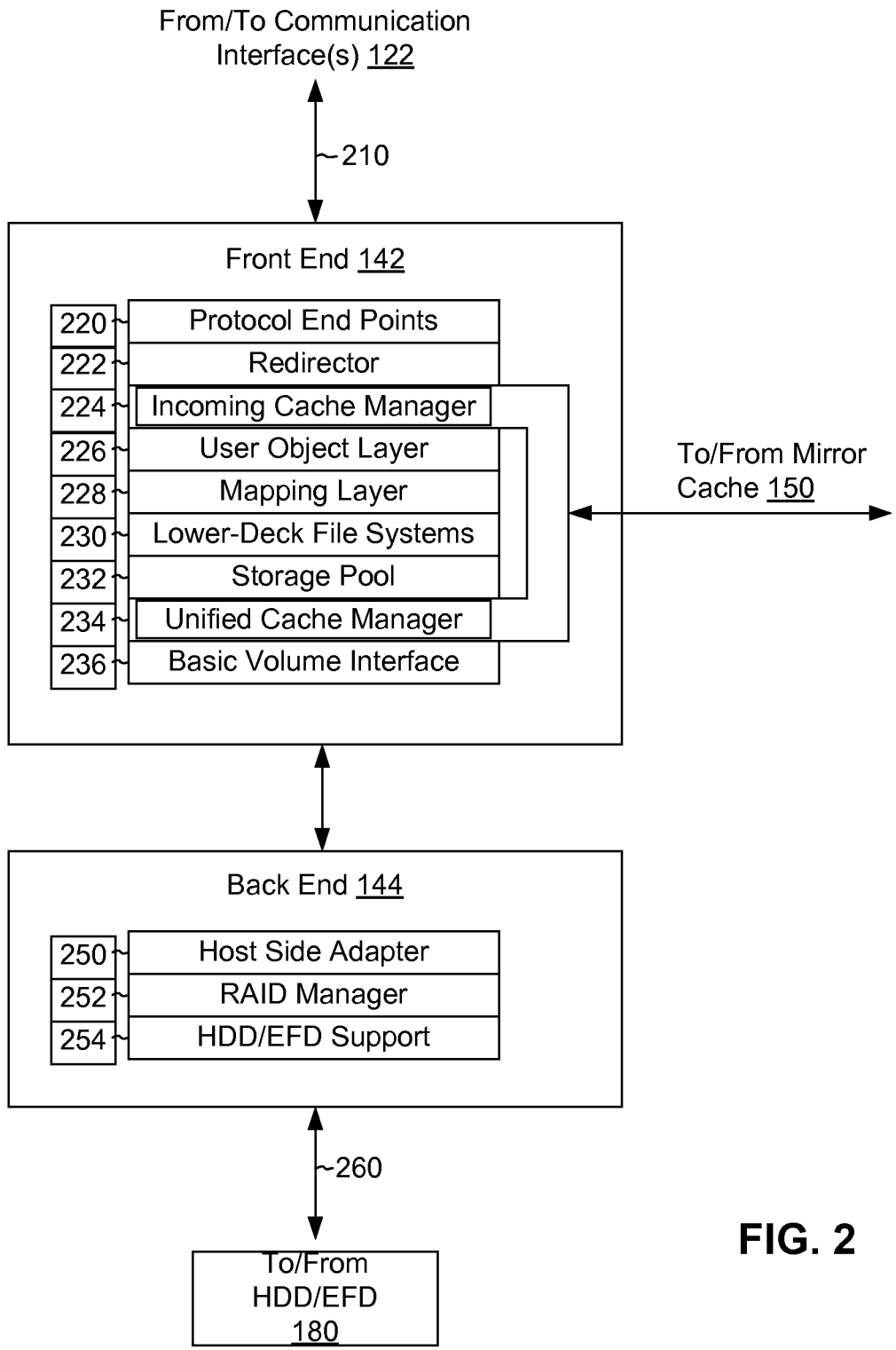
FIG. 2 is a block diagram showing particular example features of a storage processor of FIG. 1, including features of a front end and a back end of an IO stack.

FIG. 2 shows the front end 142 and back end 144 of the JO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
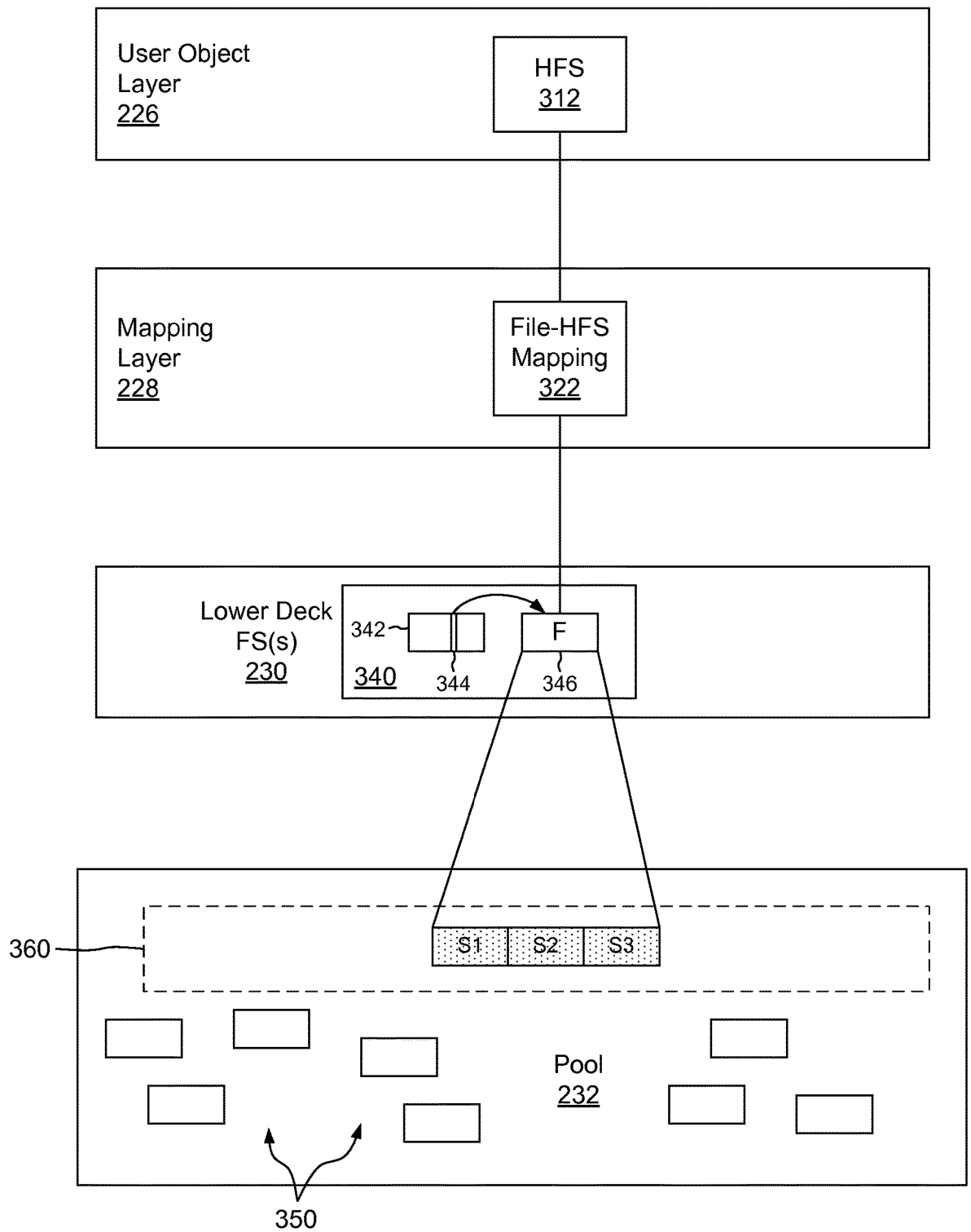
FIG. 3 is a block diagram showing example features of the front end of FIG. 2 in additional detail, including lower-deck file systems built upon storage units (e.g., slices) from a storage pool.

FIG. 3 shows portions of the front end 142 in additional detail. Here, the user object layer 226 includes a representation of an HFS (host file system) 312, and the mapping layer 228 includes a file-to-HFS mapping 322. The file-to-HFS mapping 322 maps the HFS 312 to a file F (346). Through the file-to-HFS mapping 322, any file or directory of the HFS 312 is mapped to a corresponding set of blocks within the file 346.

The file 346 is included within a particular lower-deck file system 340. The lower-deck file system 340 includes an inode table 342. The inode table 342 provides information about files in the lower-deck file system 340 in the form of inodes. For example, the inode table 342 of the lower-deck file system 340 includes an inode 344 which provides file-specific information about the file 346. The information stored in each inode includes location information (e.g., data block locations) where the data of the respective file is stored, and may thus be accessed as metadata to identify the locations of the file 346.

Although a single file is shown for the lower-deck file system 340, it is understood that each of the lower-deck file systems 230 may include any number of files, each having its own entry in the respective inode table of its file system. Also, a lower-deck file system may store not only regular files such as the file F 346, but also snapshots (point-in-time copies, also called "snaps") of such files. In this context the original file (e.g., file F 346) is referred to as a "primary" file. For instance, the lower-deck file system 340 stores the primary file 346 along with a different file for every snap of that file (such snaps effectively forming snaps of the HFS 312).

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

At least some of the lower-deck file systems 230 are associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4:
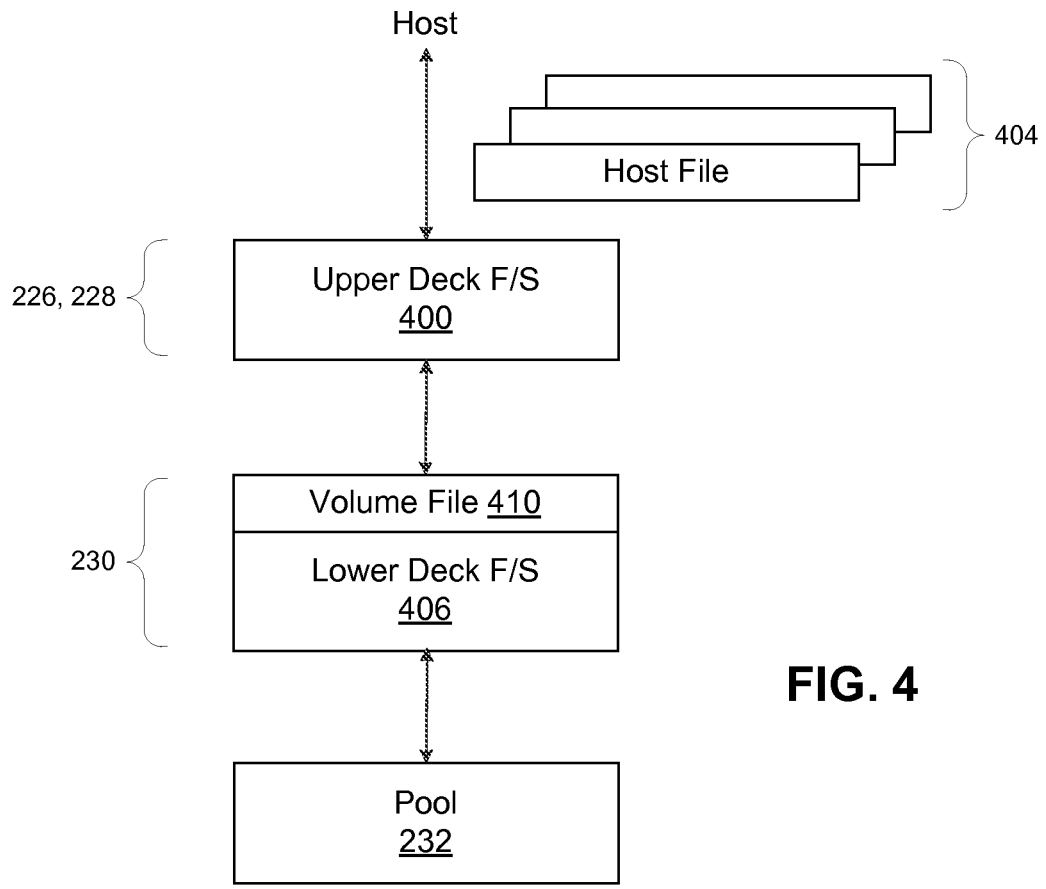
FIG. 4 is a block diagram showing file systems of the IO stack.

FIG. 4 shows another view of the organization of the data storage system useful for describing certain functionality as presented below. In FIG. 4, the user object and mapping layers 226, 228 include an upper-deck file system 400. In the illustrated embodiment, the upper-deck file system 400 corresponds to the HFS 312 of FIG. 3. Thus the upper-deck file system 400 presents data in the form of host files 404 to a separate host computer (not shown in FIG. 4). The lower-deck file system layer 230 includes a lower-deck file system 406. The lower-deck file system 406 presents a file referred to as a "volume file" 410 to the upper-deck file system 400.

As described more below, the arrangement of FIG. 4 uses so-called "thin provisioning", which refers to the manner in which slices of the pool 232 become allocated or assigned to the upper-deck file system 400 as underlying physical storage for file contents. In the present description, "thin provisioning" includes the following features:

1. Underlying storage is not fully reserved, meaning that the configured size of the upper-deck file system 400 is greater than the amount of storage in the pool 232 reserved for use by the upper-deck file system 400 to the exclusion of other potential users (e.g., other file systems 230).
2. Underlying storage is dynamically allocated, meaning that slices from the pool 232 are assigned for actual use by the upper-deck file system 400 as its contents grow in response to the writing of data.
3. The volume file 410 is sparse, i.e., only incompletely containing actual underlying storage. Slices that are cut from the volume file 410 for use by the upper-deck file system 400 are actually thinly provisioned, and corresponding storage is allocated from the lower-deck file system 406 only when the volume file 410 is effectively written into by the upper-deck file system 400. Said differently, a slice may have been provisioned into the upper deck file system 400 and yet have no storage associated to it from the lower-deck file system 406.

Each file system 400, 406 has a respective maximum size, as may be specified in blocks or bytes, for example. In the present description this may be referred to as Max(FS). At any given time there is an allocated size corresponding to the amount of underlying storage that is actually allocated for use. The upper-deck file system 400 draws slices of storage from the volume file 410, while the lower-deck file system 406 draws slices directly from the pool 232. Of course, the volume file 410 is constituted by slices from the pool 232 via operation of the lower-deck file system 406. In many cases it will be desirable that slices defined at the upper level (upper-deck file system 400 and volume file 410) are of the same size, and aligned with, slices as defined in the pool 232 and used by the lower-deck file system 406. However, in general this is not required.

Figure 5:
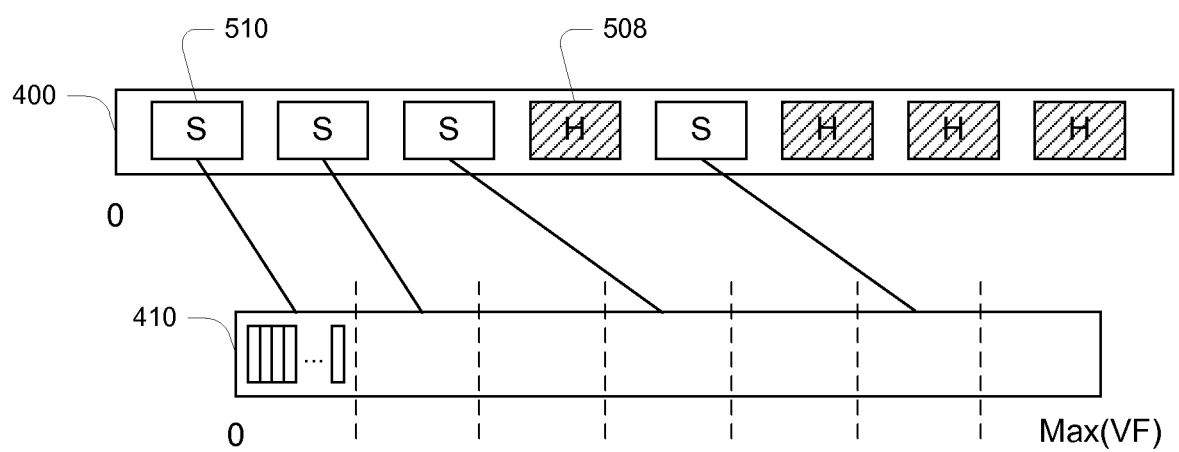
FIGS. 5 and 6 are schematic diagrams of relationships between a file system and an underlying volume.

FIG. 5 illustrates one relationship between the upper-deck file system 400 and the volume file 410 presented by the lower-deck file system 406. Slices 510 are created from corresponding slice-size areas of the volume file 410, with a generally arbitrary mapping between their respective locations. Holes 508 are slice-size areas not currently provisioned. As the actual size of the upper-deck file system 400 increases, which is reflected in holes 508 being replaced with slices 510, the size of the volume file 410 is increased accordingly. This demand from the upper-deck file system 400 is passed down to the lower-deck file system 406, to which additional pool slices 350 are allocated to enable the lower-deck file system 406 to grow the size of the volume file 410 accordingly, and this additional space is used to add slices 510 to the upper-deck file system 400. As indicated, the volume file 410 has a maximum size shown as Max(VF). If demand by the upper-deck file system 400 surpasses this value, then in general subsequent file write operations from a host to the upper-deck file system 400 may be responded to with an out-of-space condition. However, as described below this may be prevented at least under certain operating circumstances by increasing Max(VF) and allocating additional storage from the pool 232 if available.

Figure 6:
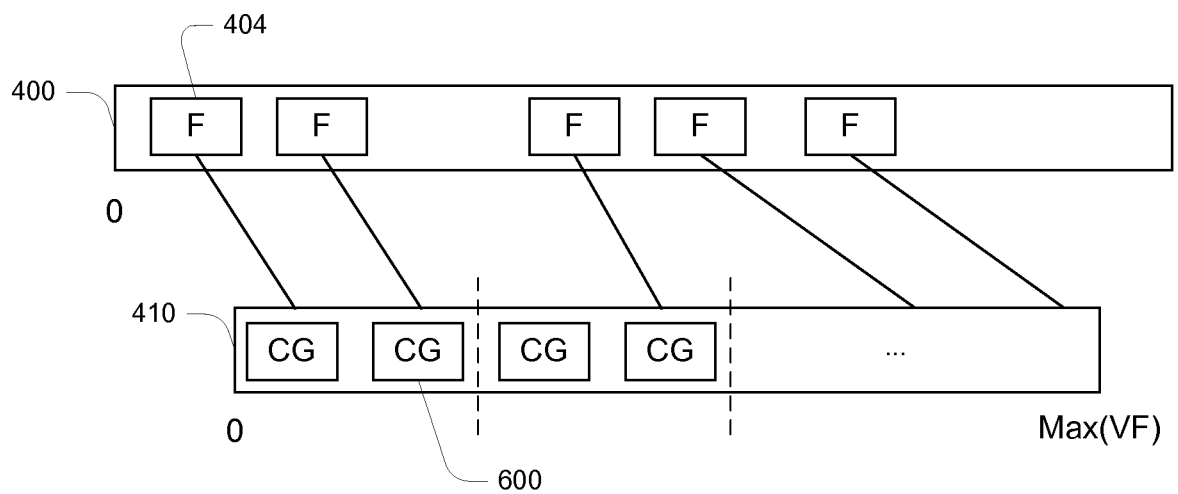

FIG. 6 illustrates another relationship between the upper-deck file system 400 and the volume file 410. The upper-deck file system 400 applies file-system formatting to the volume file 410 to make the storage provided by the volume file 410 usable to the upper-deck file system 400 for storing the host files 404. In the illustrated embodiment the formatting is in the form of sequentially arranged "cylinder groups" (CG) 600, each being a contiguous extent of a given size (e.g., 64 MB) of the volume file 410. Generally, each file 404 is structured as a set of data blocks which store the actual file data (e.g., a word processing document), as well as certain file system metadata including one or more Inodes that identify the data blocks of the file 404. A cylinder group 600 stores both data blocks and associated metadata for a set of files 404. Dividing the volume file 410 into cylinder groups can promote efficiency in file system operations.

Figure 7:
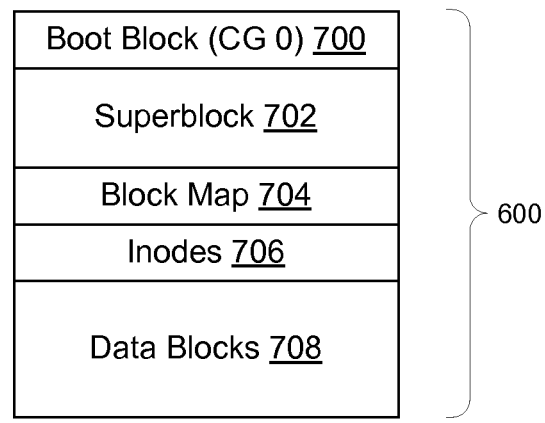
FIG. 7 is a schematic diagram of the organization of a cylinder group.

FIG. 7 illustrates a cylinder group 600 as including a boot block 700, superblock 702, block map 704, Inodes 706 and data blocks 708. The boot block 700 stores data objects used in booting the system, and appears at the beginning of the first or lowest-address cylinder group 600 (cylinder group 0). The superblock 702 stores information about the file system 410, including file system size, block size, cylinder group size, file system name and operating state, etc. Because of the criticality of this data, there may be multiple copies of the superblock 702 for redundancy. The Inodes 706 contain Inode structures for the files 404, including pointers to data blocks 708 that store the file contents. The block map 704 identifies data blocks 708 that are "free", i.e., not currently used to store file data or Inodes.

One aspect of the disclosed system is support for so-called "dense" files, i.e., files 404 for which all the underlying physical storage is reserved. This is in contrast to "sparse" files 404 for which the underlying physical storage is only reserved incrementally as file data is written. Support for dense files is one basic requirement for a CIFS file system, for example. For a dense file, space must be available up to the file size, so that I/O to any location of the dense file is not failed with a NO-SPACE error. When a dense file is extended (or data is written to a location beyond the current end of file), additional space should be reserved as a condition to completing the write. If the reservation can't be made, the file extending should be rejected.

In the illustrated system, when a dense file needs to be created or extended, it may be necessary to increase the allocated size of the upper-deck file system 400. This in turn requires increasing the size of the volume file 410. In general, the file operation that is triggering the extension of the dense file cannot be completed until the upper-deck file system 400 and volume file 410 are extended.

In prior systems, extending a thinly provisioned file system can be time-consuming, because of the need to format all newly extended space. In particular, once the space is added to the underlying volume, it is then necessary for the file system to format the entirety of the added space before any of the space is used for storing file data. The file system operation triggering the file system extension might time out or receive a NO-SPACE condition, both of which are disruptive and undesirable. Moreover, these error conditions are not due to lack of underlying storage space, but rather due to the need to make newly added space fully usable before allowing the triggering operation to be completed.

In the presently disclosed system, extending the thinly provisioned upper-deck file system 400 is speeded up while still providing the necessary guarantee of full reservation of physical storage for a dense file being created or extended. The newly extended space is added into the file system 400 in batch and then formatted little by little along with the file system actual space usage. So when a dense file reservation request comes, it just waits for adding the newly extended space into file system in batch, but does not wait for the whole space to be formatted. Thus timeout and/or NO-SPACE errors are avoided when there is sufficient underlying physical storage to extend the size of the volume file 410 and file system 400.

Figure 8:
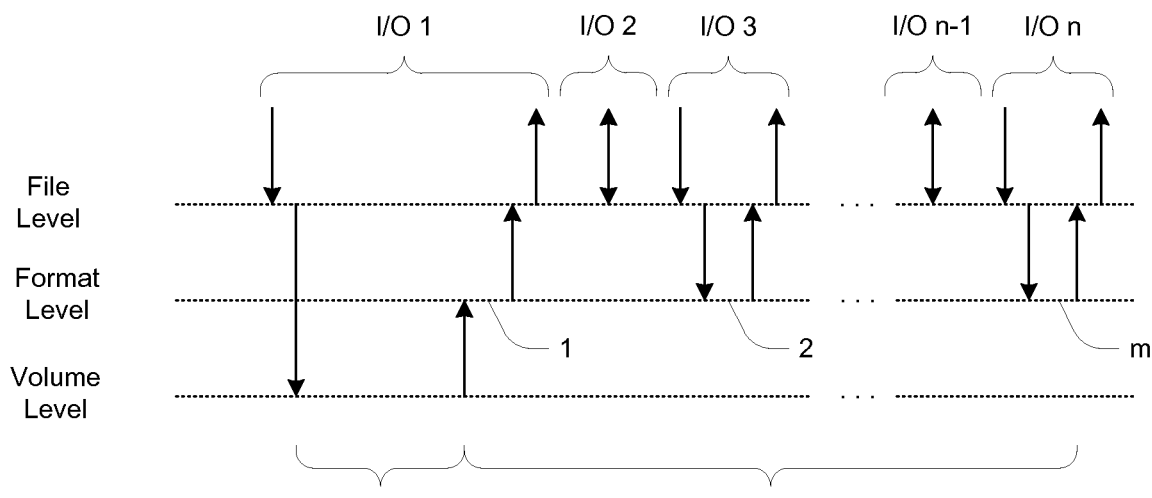
FIG. 8 is a schematic depiction of multi-level processing of I/O requests.

FIG. 8 illustrates this process schematically. The upper part of this diagram shows the receiving and responding to I/O requests. Three levels of operation of the file system 400 are shown—file level, format level and volume level. The file level operates at the level of a file 404, e.g., file creation, deletion, reading, writing etc. File size extending is initiated at this level. The format level maintains and utilizes the cylinder groups 600 to conduct lower-level operations such as creating and reading Inodes 706 and data blocks 708 of files. The volume level maintains and utilizes the space provided by the volume file 410 for raw underlying storage.

FIG. 8 shows receipt of a first I/O, I/O 1, that requires extending the size of the file system 400 and volume file 410. Operation is passed down to the volume level where a reservation of physical storage from the pool 232 (FIG. 4) is made. It is assumed that sufficient free storage is available for reservation. Once the reservation is made, the volume file 410 is extended accordingly, and operation is passed back up to the format level. In particular, the volume file 410 is extended by enough to provide the necessary guarantee of additional dense-file storage capacity, which may be one or more complete slices 510, for example. As shown, the volume-level reservation operation requires a time Tres.

At the format level, an initial portion of a new cylinder group 600 is formatted during a period identified as "1". Operation is then passed up to the file level where I/O 1 is completed using the newly formatted space and then an "OK" or "success" response is returned to the requestor. The initial portion is substantially less than the entirety of the added space.

The total latency for I/O 1 is equal to Tres plus the time required to format the initial portion of the new space.

Subsequently, additional I/Os are received that require that additional space be formatted for use. Additional formatting is done incrementally as such I/Os are received, in periods identified as "2", . . . "m". The total elapsed time to completely format the new space is shown as Tfmt.

Figure 9:
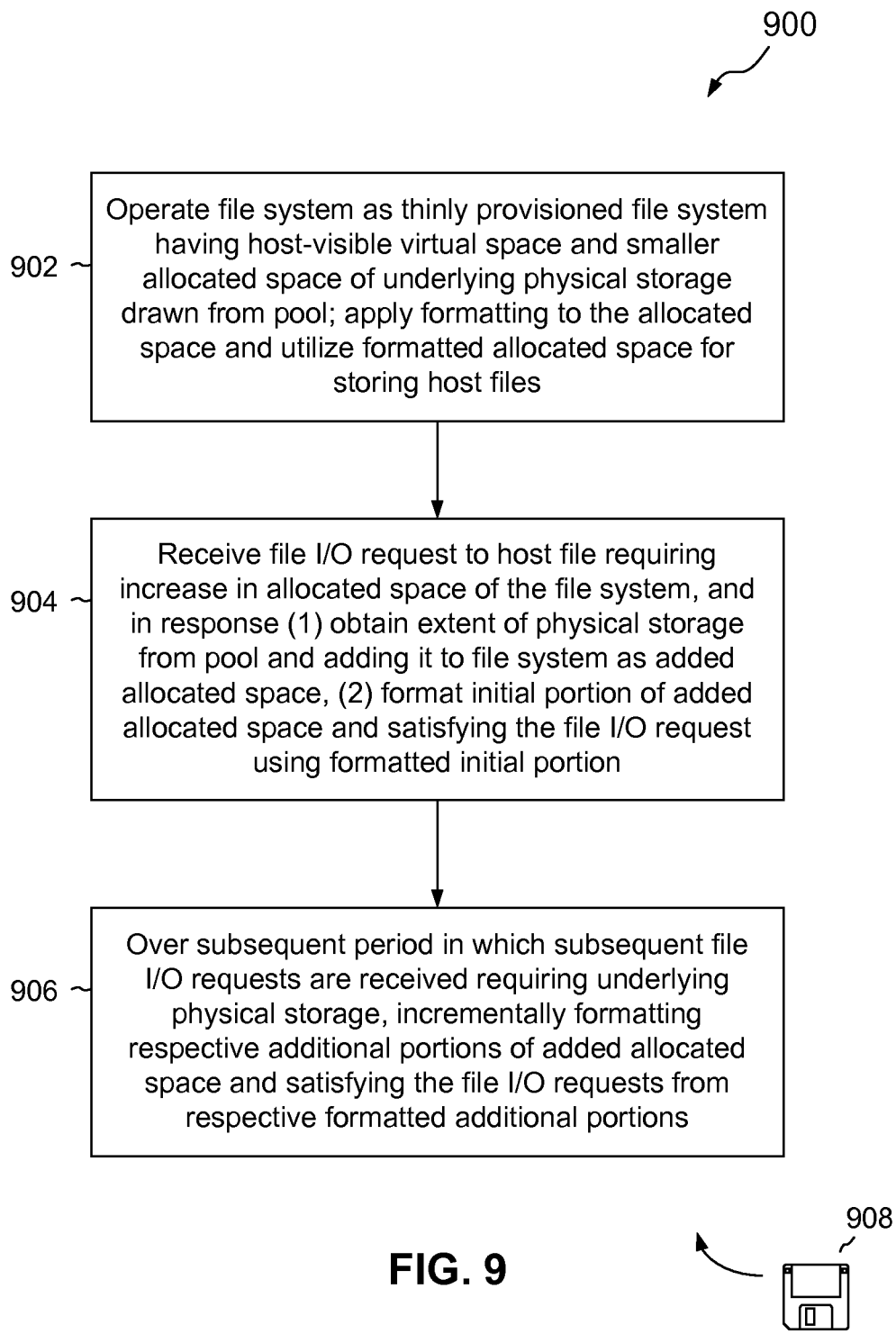
FIG. 9 is a flow diagram of operation of a file system.

FIG. 9 is a flow diagram of a process 900 for the operation illustrated in FIG. 8. At 902, storage processor 120 (FIG. 1) operates a file system as a thinly provisioned file system having a host-visible virtual space and a smaller allocated space of underlying physical storage drawn from a pool. The file system applies formatting to the allocated space and utilizes the formatted allocated space for storing host files.

At 904, the file system receives a file I/O request to a host file requiring an increase in the allocated space of the file system. In response, the file system (1) obtains an extent of physical storage from the pool and adds it to the file system as added allocated space, and (2) formats an initial portion of the added allocated space and satisfies the file I/O request using the formatted initial portion.

At 906, over a subsequent period in which subsequent file I/O requests are received requiring underlying physical storage, the file system incrementally formats respective additional portions of the added allocated space and satisfies the subsequent file I/O requests from the respective formatted additional portions. The file system 400 may monitor for provisioning of each additional portion and format each additional portion as it is provisioned.

Software implementing the above process may be stored on and instantiated from a non-transitory computer-readable medium 908 such as a magnetic or optical disk or nonvolatile semiconductor memory such as Flash.

In the above operation, the file system 400 may detect that it is unable to perform the incremental formatting at a sufficiently high rate matching a rate of the subsequent I/O requests. Upon detecting this situation, the file system 400 may temporarily suspend I/O requests as necessary to complete the incremental formatting without causing an I/O request to timeout.

Although in the illustrated embodiment the subject host file system 312 is an upper-deck file system 400 using an underlying volume file 410 provided by a lower-deck file system 406, in alternative embodiments the host file system 312 may utilize an underlying volume implemented in a different manner. More generally the technique assumes that the volume can be extended dynamically with reservation of added space to the host file system 312, enabling the host file system 312 to allow a dense file to be created or extended in size with the required guarantee of underlying available storage.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system to provide file storage to hosts over a network, comprising:
    operating a file system as a thinly provisioned file system having a host-visible virtual space and a smaller allocated space of underlying physical storage drawn from a pool;
    receiving an initial file I/O request to a host file requiring an increase in the allocated space of the file system, and in response (1) obtaining an extent of physical storage from the pool and adding it to the file system as added allocated space, (2) formatting an initial portion of the extent and satisfying the file I/O request using the formatted initial portion, the formatting being file system formatting by which the extent becomes formatted into a series of cylinder groups, each cylinder group including respective data blocks storing file contents and respective file metadata describing assignment of the data blocks to respective files of the file system stored as part of the respective cylinder group; and
    over subsequent periods in which respective subsequent file I/O requests are received requiring underlying physical storage, incrementally performing respective additional file system formatting of the extent and satisfying the subsequent file I/O requests from respective formatted additional portions of the extent.

2. A method according to claim 1, wherein the host files include sparse files and dense files, a sparse file being extended by a given first amount without requiring a corresponding extension of the allocated space of the file system, a dense file being extended by a given second amount only when the allocated space of the file system is also increased by the second amount, and wherein the host file of the file I/O request is a dense file being created or extended by the file I/O request.

3. A method according to claim 1, wherein the file system is an upper deck file system, and further including operating a lower deck file system providing a volume file used by the upper deck file system for file storage, and wherein obtaining the extent of physical storage from the pool and adding it to the file system includes the lower deck file system adding the extent of physical storage to the volume file.

4. A method according to claim 3, wherein the lower deck file system adds the extent of physical storage to the volume file incrementally over the subsequent period as the subsequent file I/O requests are received requiring underlying physical storage.

5. A method according to claim 1, wherein incrementally formatting the additional portions of the extent includes formatting each additional portion as it is provisioned.

6. A method according to claim 5, further including (1) detecting an inability to perform the incremental formatting at a sufficiently high rate matching a rate of the subsequent file I/O requests, and (2) upon detecting the inability, temporarily suspending file I/O requests as necessary to complete the incremental formatting without causing a file I/O request to timeout.

7. A method according to claim 1, wherein the initial portion of the extent includes an initial portion of a new cylinder group of the extent.

8. A data storage system for providing file storage to hosts over a network comprising:
    one or more physical storage devices providing nonvolatile physical storage; and
    a processing subsystem executing software to form a multi-level stack of functional components including a file system operated as a thinly provisioned file system having a host-visible virtual space and a smaller allocated space of underlying physical storage drawn from a pool, the file system:
        receiving an initial file I/O request to a host file requiring an increase in the allocated space of the file system, and in response (1) obtaining an extent of physical storage from the pool and adding it to the file system as added allocated space, (2) formatting an initial portion of the extent and satisfying the file I/O request using the formatted initial portion, the formatting being file system formatting by which the extent becomes formatted into a series of cylinder groups, each cylinder group including respective data blocks storing file contents and respective file metadata describing assignment of the data blocks to respective files of the file system stored as part of the respective cylinder group; and
        over subsequent periods in which respective subsequent file I/O requests are received requiring underlying physical storage, incrementally performing respective additional file system formatting of the extent and satisfying the subsequent file I/O requests from respective formatted additional portions of the extent.

9. A data storage system according to claim 8, wherein the host files include sparse files and dense files, a sparse file being extended by a given first amount without requiring a corresponding extension of the allocated space of the file system, a dense file being extended by a given second amount only when the allocated space of the file system is also increased by the second amount, and wherein the host file of the file I/O request is a dense file being created or extended by the file I/O request.

10. A data storage system according to claim 8, wherein the file system is an upper deck file system, and wherein multi-level stack of functional components further includes a lower deck file system providing a volume file used by the upper deck file system for file storage, and wherein obtaining the extent of physical storage from the pool and adding it to the file system includes the lower deck file system adding the extent of physical storage to the volume file.

11. A data storage system according to claim 10, wherein the lower deck file system adds the extent of physical storage to the volume file incrementally over the subsequent period as the subsequent file I/O requests are received requiring underlying physical storage.

12. A data storage system according to claim 8, wherein incrementally formatting the additional portions of the extent includes formatting each additional portion as it is provisioned.

13. A data storage system according to claim 12, wherein incrementally formatting further includes (1) detecting an inability to perform the incremental formatting at a sufficiently high rate matching a rate of the subsequent file I/O requests, and (2) upon detecting the inability, temporarily suspending file I/O requests as necessary to complete the incremental formatting without causing a file I/O request to timeout.

* * * * *